United States Patent
Roberts et al.

(10) Patent No.: US 9,936,633 B2
(45) Date of Patent: Apr. 10, 2018

(54) STALK CUTTER DEVICE AND METHOD OF USE

(71) Applicant: Board of Trustees of the University of Arkansas, Little Rock, AR (US)

(72) Inventors: Trenton Lee Roberts, Fayetteville, AR (US); Chester Eugene Greub, Gower, MO (US)

(73) Assignee: Board of Trustees of the University of Arkansas, Little Rock, AR (US)

( * ) Notice: Subject to any disclaimer, the term of this patent is extended or adjusted under 35 U.S.C. 154(b) by 149 days.

(21) Appl. No.: 14/987,969

(22) Filed: Jan. 5, 2016

(65) Prior Publication Data

US 2016/0219785 A1    Aug. 4, 2016

Related U.S. Application Data

(60) Provisional application No. 62/109,917, filed on Jan. 30, 2015.

(51) Int. Cl.
*A01D 1/14* (2006.01)
*A01D 1/00* (2006.01)
*A01G 3/025* (2006.01)

(52) U.S. Cl.
CPC .......... *A01D 1/14* (2013.01); *A01D 1/00* (2013.01); *A01G 3/0251* (2013.01)

(58) Field of Classification Search
CPC ............ A01D 1/00–1/14; A01G 3/0251
See application file for complete search history.

(56) References Cited

U.S. PATENT DOCUMENTS

| | | | |
|---|---|---|---|
| 642,973 A | 2/1900 | Galbreath | |
| 1,012,918 A | 12/1911 | Roelants et al. | |
| 1,294,033 A | 2/1919 | Bizette | |
| 1,925,952 A | 9/1933 | Cox, Jr. | |
| 2,138,726 A | 11/1938 | Cartwright | |
| 2,155,241 A * | 4/1939 | Rubin | A41H 9/00 30/231 |
| 2,840,905 A | 7/1958 | Geiger | |
| 3,203,094 A | 8/1965 | Couture | |
| 4,054,991 A * | 10/1977 | Bahr | B26B 13/24 30/231 |
| 4,236,308 A | 12/1980 | Vredenburg, Sr. | |
| 4,662,158 A * | 5/1987 | Zerrer | A01D 34/902 123/185.2 |

(Continued)

OTHER PUBLICATIONS

John Dietz, Nov. 30, 2009, Top Crop Manager, https://www.topcropmanager.com/fertility-nutrients/cornstalk-nitrate-test-valid-in-manitoba-4921.*

(Continued)

*Primary Examiner* — Robert E Pezzuto
*Assistant Examiner* — Adam J Behrens
(74) *Attorney, Agent, or Firm* — Crowe & Dunlevy, P.C.

(57) ABSTRACT

The stalk cutter device and method of use thereof obtains a desired length of plant stalk, particularly a cornstalk, from a desired distance from the ground. The stalk cutter device includes a pair of handles pivotally connected to a pair of pruning type of cutters. A support rod is mounted through the pivot connections of the cutters and extends laterally a desired distance from the lower cutter to support the device at the desired height to cut the desired portion of the stalk.

12 Claims, 7 Drawing Sheets

(56) References Cited

U.S. PATENT DOCUMENTS

| | | | | |
|---|---|---|---|---|
| 5,600,891 | A * | 2/1997 | Orgal | B26B 13/00 30/226 |
| 2004/0107579 | A1 * | 6/2004 | Deville | A01G 3/0251 30/100 |
| 2007/0079512 | A1 * | 4/2007 | Nelson | B25G 1/04 30/123.3 |
| 2007/0157473 | A1 * | 7/2007 | Varnell | B26B 13/22 30/194 |

OTHER PUBLICATIONS

Susan Winsor, Oct. 31, 2014, Corn and Soybean Digest, http://www.cornandsoybeandigest.com/fertilizer/cornstalk-nitrate-test-reveals-nitrogen-application-accuracy.*

Hansen, David, Binford, Greg, and Sims, Tom; End-of-Season Corn Stalk Nitrate Testing to Optimize Nitrogen Management, Cooperative Extension, University of Delaware College of Agricultural and Natural Resources, Nov. 4, 2004.

On-Farm Network Update, Agronomic research and economic performance; Jul. 2008, Managing Nitrogen for Economic and Environmental Performance.

Sims, J. T., B. L. Vasilas, K. L. Gartley, B. Milliken, and V. Green. 1995. Evaluation of soil and plant nitrogen tests for maize on manured soils of the Atlantic Coastal Plain. Agron. J. 87:213-222.

Binford, G. D., A. M. Blackmer, and N. M. El-Hout. 1990. Tissue test for excess nitrogen during corn production. Agron. J. 82:124-129.

* cited by examiner

STALK CUTTER DEVICE AND METHOD OF USE

CROSS REFERENCE TO RELATED APPLICATIONS

This application claims the benefit of and priority to U.S. Provisional Patent Application Ser. No. 62/109,917, filed Jan. 30, 2015, which is incorporated herein by reference in its entirety.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

REFERENCE TO A SEQUENCE LISTING, A TABLE, OR A COMPUTER PROGRAM LISTING APPENDIX

Not Applicable.

STATEMENT REGARDING PRIOR DISCLOSURES BY THE INVENTOR OR A JOINT INVENTOR

Not Applicable.

BACKGROUND OF THE INVENTION

1. Field of the Invention

This invention relates generally to a stalk cutter device and method of use thereof, and in particular to a dual, spaced stalk cutter device and method of use for obtaining a desired length of plant stalk, particularly a cornstalk, from a desired distance from the ground.

2. Description of the Related Art

Currently in the United States, there are over 100 million acres of corn planted each year, which receives anywhere from 150 to 300 pounds of nitrogen (N) per acre per year. Over the years, there has been an improved N use efficiency of corn in the U.S. given that excess N applications can lead to adverse crop conditions (e.g., disease, lodging) with the off-site environmental impacts of N runoff being the primary concern.

The end-of-season Corn Stalk Nitrate Test (CSNT) was developed to allow corn producers to measure the N status of a corn crop at the end of the growing season prior to harvest and identify whether a field was properly fertilized that season. The CSNT is based on corn plants either removing N from, or accumulating N in, the lower stalk based on soil N availability and relies on the relationship between the amount of N found in the lower stalks late in the growing seasons and the likelihood that corn had been under or over-fertilized. Although the CSNT does not allow producers to make changes for the current growing season, it is an important diagnostic tool for managing nitrogen in subsequent years. The CSNT has been adopted by the Natural Resource Conservation Service (NRCS) as a requirement for many of its conservation programs, and as such, more corn producers will be required to take cornstalk samples for the CSNT in the future.

In order to use the CSNT, cornstalks should be sampled at least one week after black layers have formed on about 80% of the kernels of most ears, but can be sampled up to harvest. Areas selected for sampling for the CSNT should be on a uniform soil type and management history. The cornstalk samples are collected by cutting an eight (8)-inch segment of stalk precisely between six (6) and fourteen (14) inches above the soil, with any leaf sheaths being removed from the stalk samples. Any severely damaged or diseased stalks should be avoided during sampling, and at least ten (10) samples should be collected from every ten (10) acres of corn and combined to form a single sample.

Typically producers use machetes or hand pruners and carry a measuring stick in order to collect plant stalk samples. This method is very cumbersome and generally requires two (2) people to be performed properly and accurately. This method generally employed involves selecting a suitable plant stalk, measuring fourteen (14) inches from the soil surface, and then making a first cut with the hand pruners to remove the portion of the stalk above the first cut. The user then has to place the meter stick alongside the stalk and make a second cut at precisely six (6) inches above the soil surface while holding the stalk to prevent it from falling on the soil and getting contaminated. When using this current method, there is the potential for several sources of variability to occur especially when making multiple cuts that low to the ground with either hand pruners or machetes.

Therefore, collecting samples properly and efficiently is a major problem and is a primary limiting factor in the widespread adoption of this diagnostic tool. As more producers are being required to take samples for the CSNT, it is imperative that a tool be developed to allow producers to take the correct portion of the cornstalk in a timely manner. Since the recommended number of samples that is currently being required by the NRCS is ten (10) samples per (10) acres of corn, if the CSNT were fully implemented on all of the corn acreage in the U.S., roughly 100 million corn stalk samples would be required to be taken on an annual basis. As such, the need for a reliable sampling device and method is desperately needed.

It is therefore desirable to provide a stalk cutter device and related method of using the device for obtaining a desired length of plant stalk, particularly a cornstalk, from a desired distance from the ground.

It is further desirable to provide a dual, spaced cornstalk cutter device that aids in the implementation of the CSNT and ensures that collected data is reliable and useful for corn producers.

It is yet further desirable to provide a dual, spaced cornstalk cutter device that is configured to cut and remove an eight (8)-inch section of stalk from exactly six (6) to fourteen (14) inches above the soil surface.

It is still yet further desirable to provide a dual, spaced cornstalk cutter device that increases the precision of the cuts in a single motion reducing the need for multiple tools and ensures that the proper portion of the cornstalk is sampled.

It is still yet further desirable to provide a dual, spaced cornstalk cutter device that increases the number of samples that a person can take reducing labor costs and other needs.

It is still yet further desirable to provide a dual, spaced cornstalk cutter device having spacers and two (2) cutting surfaces that allow the user to make accurate cuts in a single motion without the need to carry multiple items in the field.

It is still yet further desirable to provide a dual, spaced cornstalk cutter device having spacers that allow the stalk samples to be taken quickly and efficiently while ensuring that the correct portion of the stalk is removed.

It is still yet further desirable to provide a dual, spaced cornstalk cutter device that retains the eight (8)-inch stalk sample between the two (2) cutting surfaces until the user removes the sample from the device to ensure that the sample does not fall to the soil surface and become contaminated.

Other advantages and features of the invention will be apparent from the following description and from the claims.

BRIEF SUMMARY OF THE INVENTION

In general, in a first aspect, the invention relates to a stalk cutter device for obtaining a desired length of a plant stalk from a desired distance from the ground. The device includes a pair of ergonomic handles pivotally connected to a pair of pruning type cutters at terminal ends of the handles. A support rod is mounted through the pivot connections of the handles and the cutters, and the support rod extends downwardly from one of the cutters the desired distance to the ground. The cutters are axially aligned and coaxially spaced along the rotational axis formed by the support rod, with the cutters configured in a spaced relation for obtaining the desired length of the stalk in a single motion. Moreover, the cutters are configured to retain the stalk and prevent contamination of the stalk while a user obtains the stalk sample.

The stalk cutter device can also include a left handle and a right handle each pivotally connected to an upper cutter and a lower cutter. The upper cutter and the lower cutter are axially aligned and coaxially spaced along the support rod, with the upper cutter being spaced eight (8) inches from the lower cutter and the lower cutter being spaced six (6) inches from a terminal end of the support rod. As such, the upper cutter and the lower cutter are in a spaced relation for obtaining an eight (8)-inch sample of a cornstalk from between six (6) and fourteen (14) inches above the ground.

In general, in a second aspect, the invention relates to a dual, spaced cornstalk cutter device configured for obtaining an eight (8) inch sample of a cornstalk from between six (6) and fourteen (14) inches above the ground. The device includes an upper lopper having a pair of ergonomic handles, with the upper lopper being joined to and pivotally connected to a lower lopper using a support rod. The upper lopper and the lower lopper are axially aligned and coaxially spaced along the support rod. The upper lopper is spaced eight (8) inches above the lower lopper, and the lower lopper is spaced six (6) inches above a terminal footing of the support rod. The upper lopper and the lower lopper are configured to retain and prevent contamination of the sample of the cornstalk.

Pursuant to either aspect of the invention, the handles of the stalk cutter device can be generally U-shaped handles with angular handgrip portions and/or upright handles configured to reduce the extent to which a user must bend over in order to obtain the sample of the cornstalk. In addition, the device may include a carrying strap. Moreover, the device may be constructed of a durable, resilient and lightweight material, such as aluminum or a composite material.

DETAILED DESCRIPTION OF THE INVENTION

Figure 1:
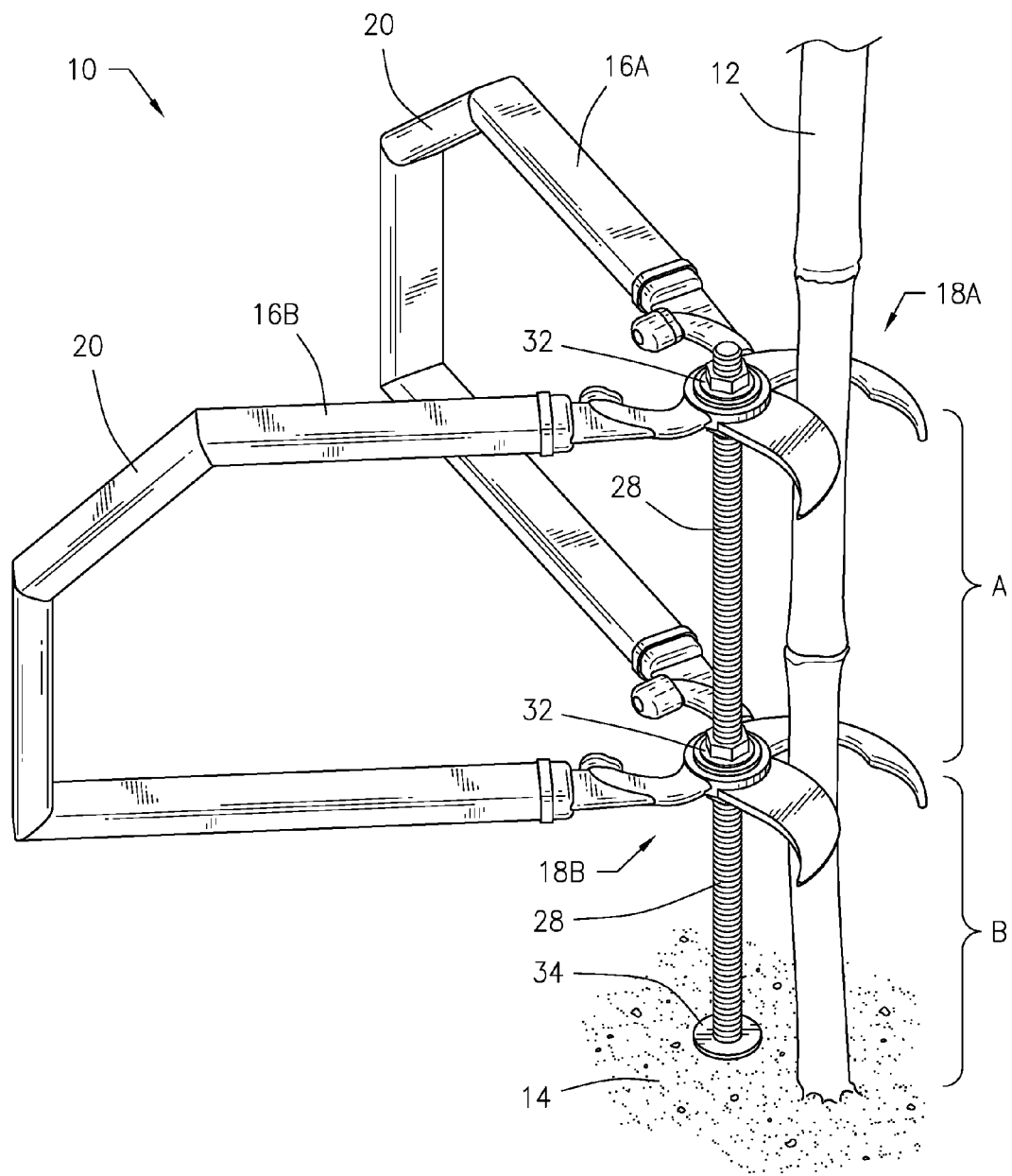
FIG. 1 is a perspective view of an example of a stalk cutter device shown in use taking a sample in accordance with an illustrative embodiment of the invention disclosed herein.
Figure 2:
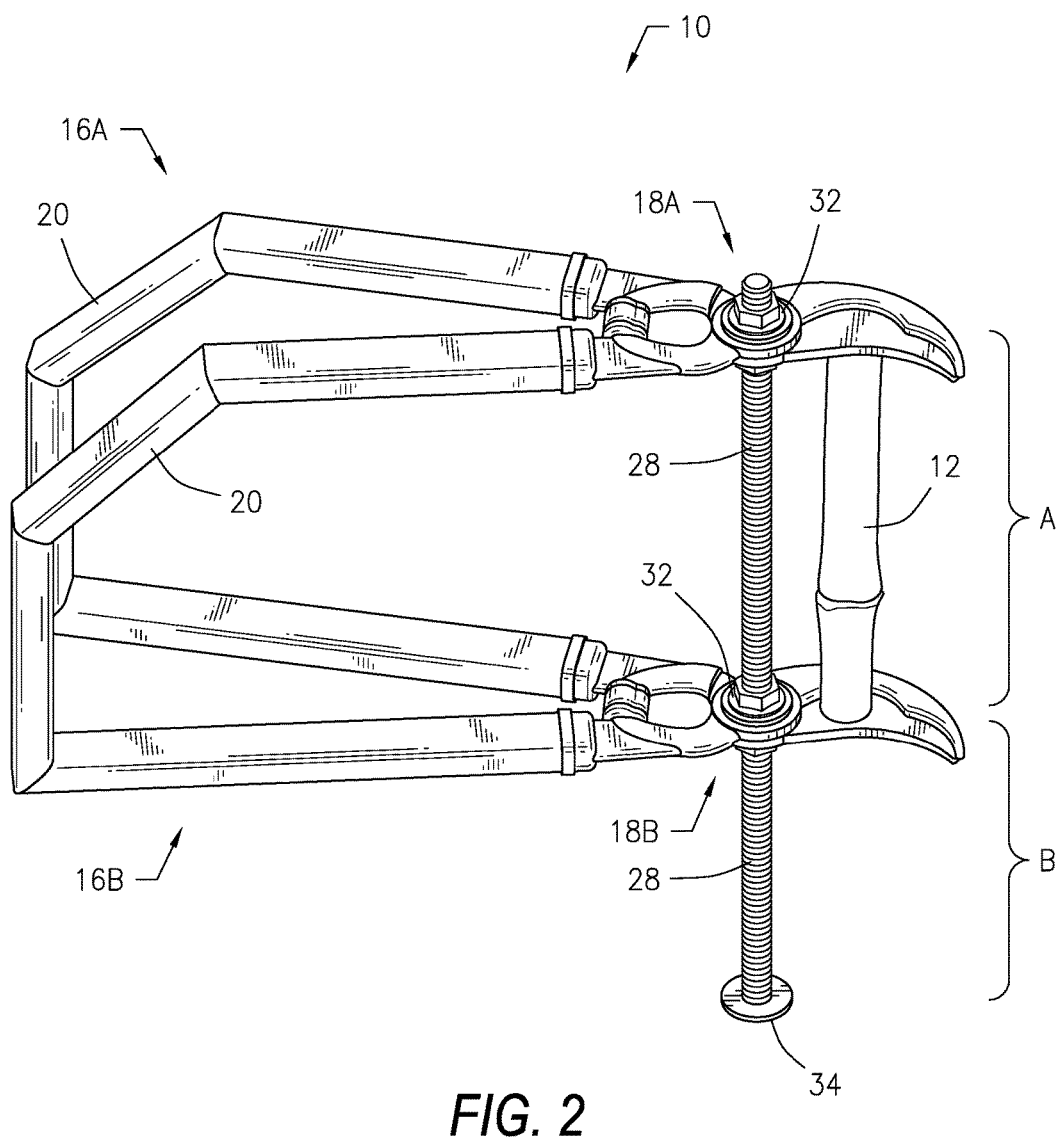
FIG. 2 is a perspective view of the stalk cutter device shown in FIG. 1 retaining the sampled stalk section between the two (2) cutting surfaces.
Figure 3:
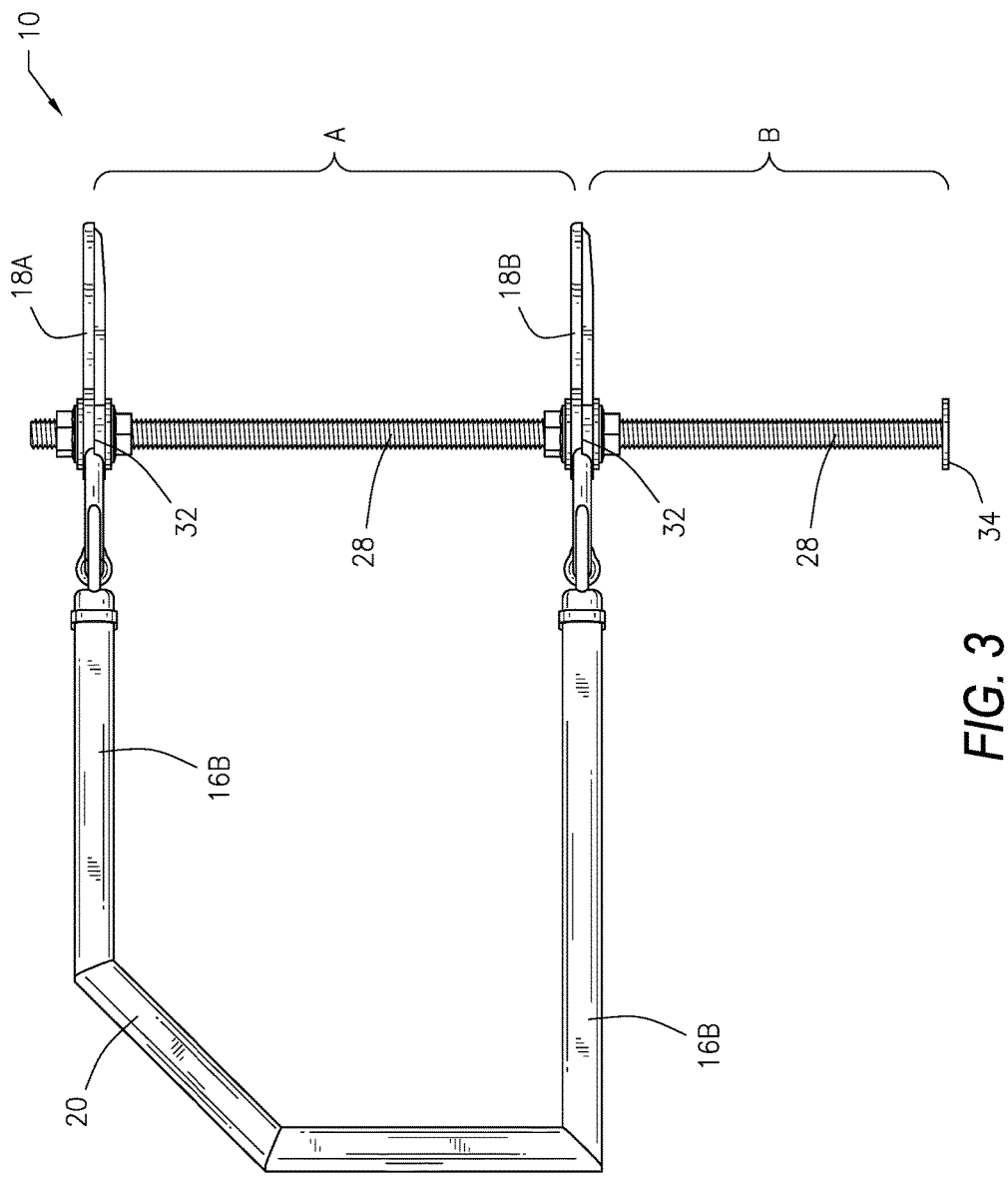
FIG. 3 is a right side elevation view of the stalk cutter device shown in FIG. 1.
Figure 5:
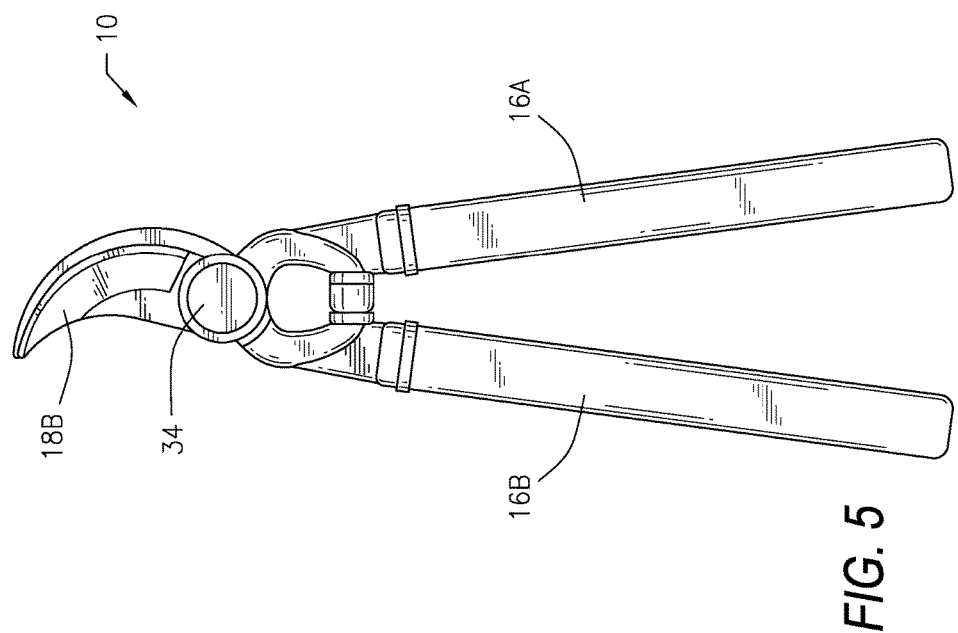
FIG. 5 is a bottom elevation view of the stalk cutter device shown in FIG. 1.
Figure 4:
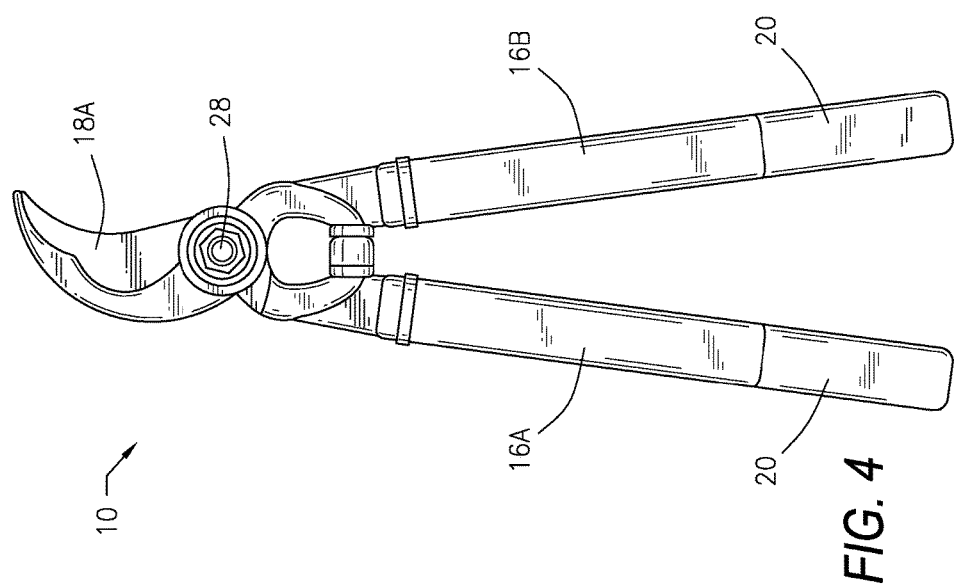
FIG. 4 is a top elevation view of the stalk cutter device shown in FIG. 1.
Figure 7:
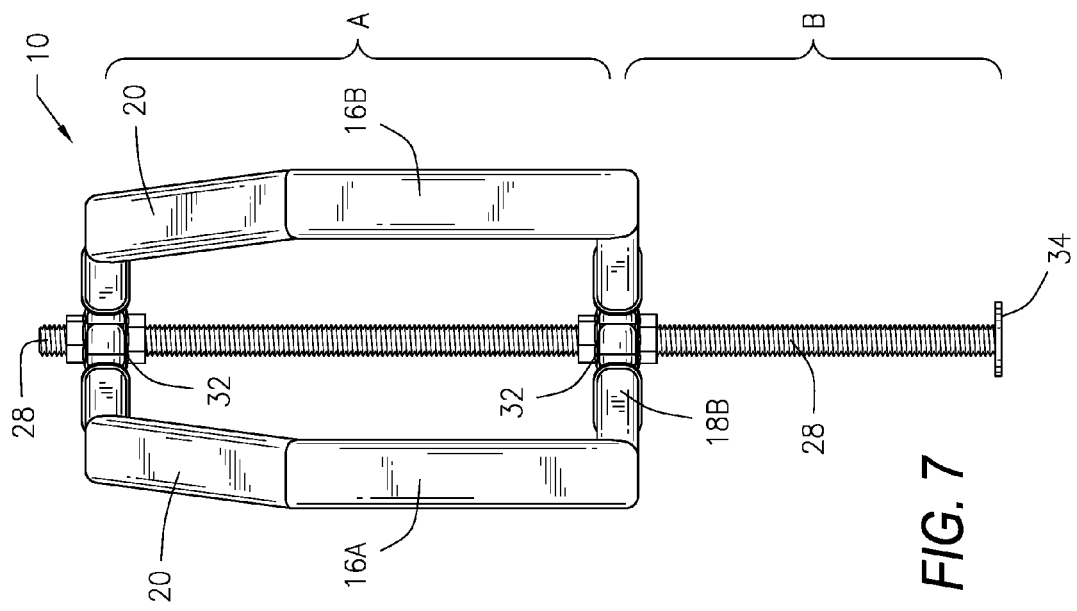
FIG. 7 is a rear elevation view of the stalk cutter device shown in FIG. 1.
Figure 6:
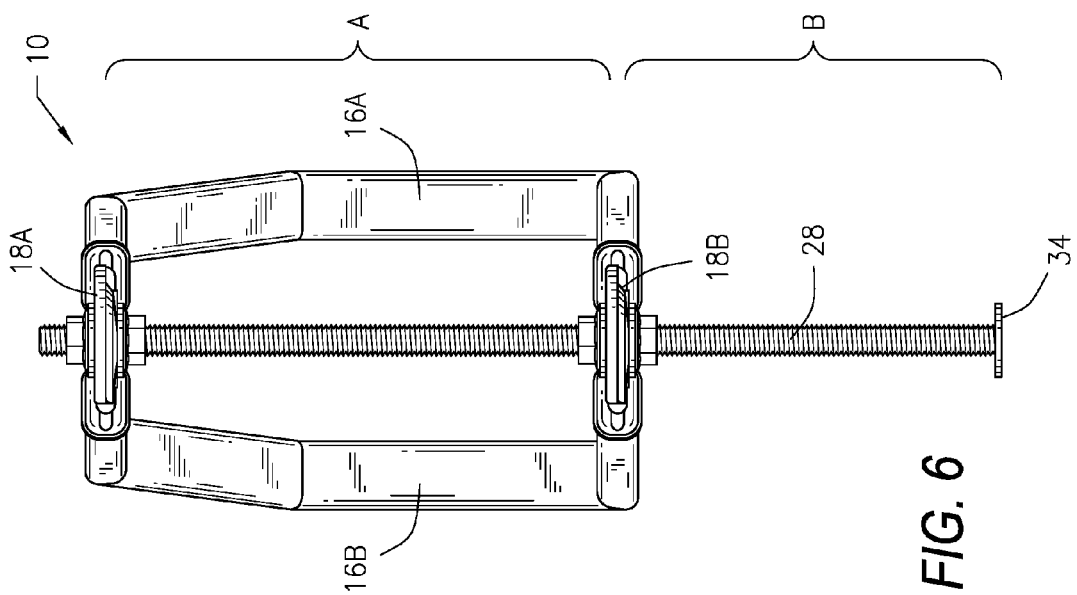
FIG. 6 is a front elevation view of the stalk cutter device shown in FIG. 1.

The devices and methods discussed herein are merely illustrative of specific manners in which to make and use this invention and are not to be interpreted as limiting in scope.

While the invention has been described with a certain degree of particularity, it is to be noted that many modifications may be made in the details of the construction and the arrangement of the elements and components of the devices and/or in the sequences and steps of the methods without departing from the scope of this disclosure. It is understood that the devices and methods are not limited to the embodiments set forth herein for purposes of exemplification.

The description of the invention is intended to be read in connection with the accompanying drawings, which are to be considered part of the entire written description of this invention. In the description, relative terms such as "front," "rear," "lower," "upper," "horizontal," "vertical," "above," "below," "up," "down," "top" and "bottom" as well as derivatives thereof (e.g., "horizontally," "downwardly," "upwardly" etc.) should be construed to refer to the orientation as then described or as shown in the drawings under discussion. These relative terms are for convenience of description and do not require that the machine be constructed or the process to be operated in a particular orientation. Terms, such as "connected," "connecting," "attached," "attaching," "join" and "joining" are used interchangeably and refer to one structure or surface being secured to another structure or surface or integrally fabricated in one piece.

Figure 8:
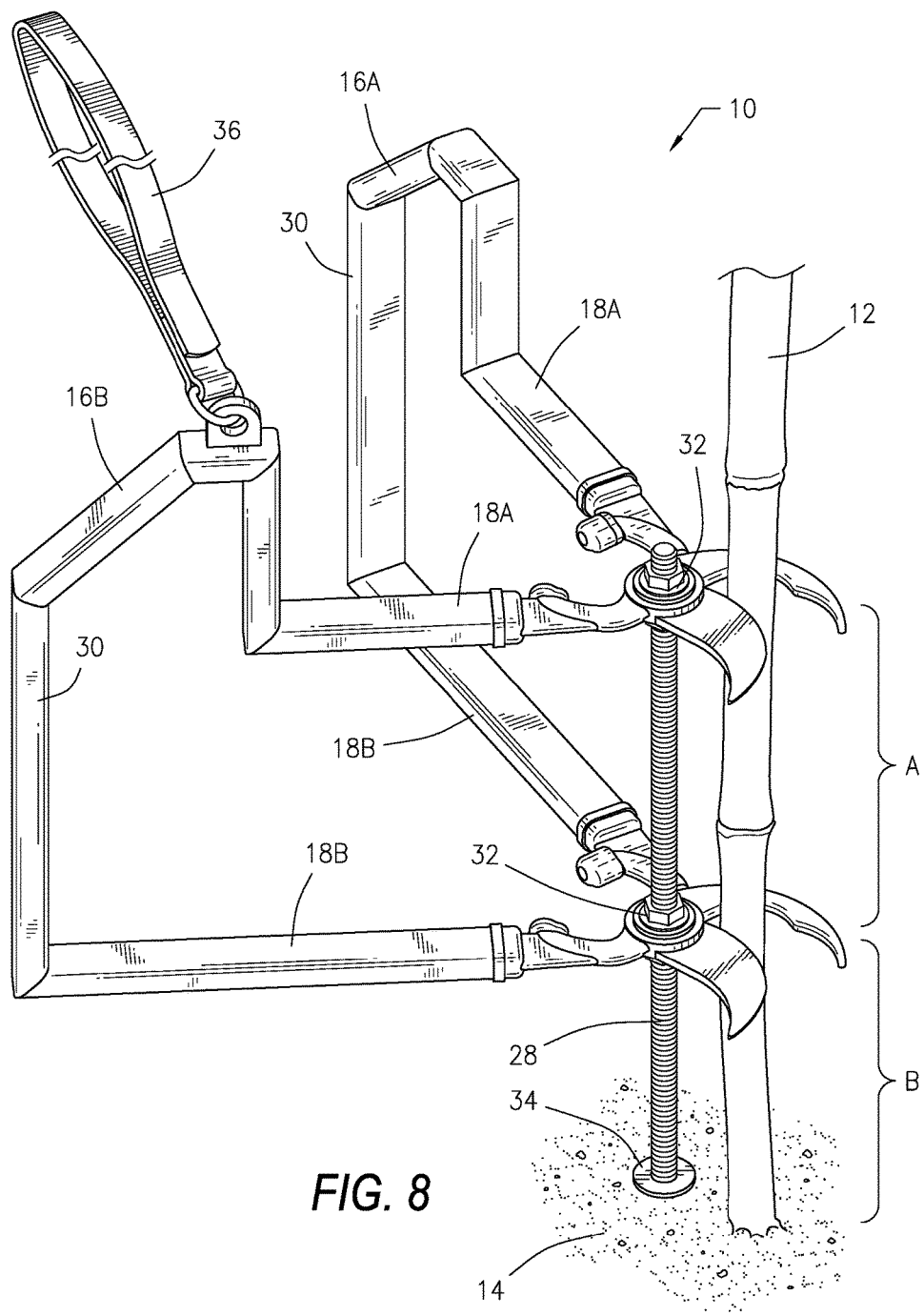
FIG. 8 is a perspective view of another example of a stalk cutter device in accordance with an illustrative embodiment of the invention disclosed herein.
Figure 9:
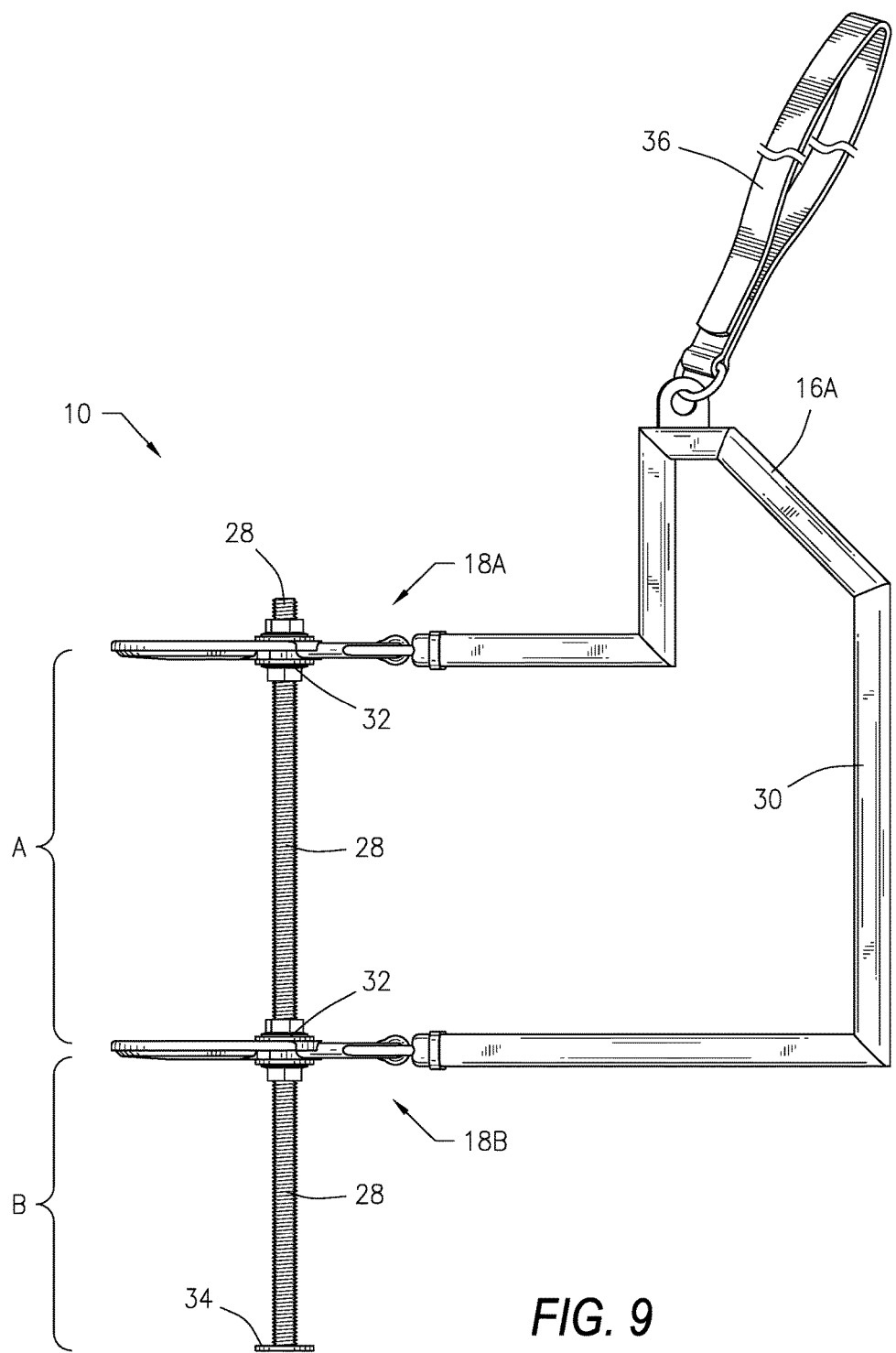
FIG. 9 is a left side elevation view of the stalk cutter device shown in FIG. 8.

Referring to the figures of the drawings, wherein like numerals of reference designate like elements throughout the several views, a stalk cutter device 10 and method of use thereof for obtaining a desired length A of plant stalk 12, particularly a cornstalk, from a desired distance B from the ground 14. The stalk cutter device 10 includes a pair of handles 16 pivotally connected to a pair of pruning type cutters 18 at terminal ends of the handles 16, and as exemplified in FIGS. 1 through 7, a left handle 16A and a right handle 16B are pivotally connected to an upper cutter 18A and a lower cutter 18B. The handles 16 are ergonomically constructed, such as generally U-shaped handles with angular handgrip portions 20. In another aspect as illustrated in FIGS. 8 and 9, the cutters 18 are configured as an upper lopper 18A having a pair of ergonomic upright handles 16, which is joined to and pivotally connected to a lower lopper 18B using a support rod 28 and a linkage 30. The upright handles 16 are also ergonomically constructed to prevent the user from having to bend over, or at least to make it easier for the user to sample even though they would still have to bend over, to take the sample of the stalk 12.

The support rod 28 is mounted through the pivot connections 32 between the cutters 18 and extends downward the desired distance B from the lower cutter 18B to support the device 10 at the desired distance B to cut the desired length A of the stalk 12. The support rod 28 includes a footing 34 to support the device 10 on the ground 14 during use. The upper cutter 18A and the lower cutter 18B are axially aligned and coaxially spaced along the support rod 28, and the stalk cutter device 10 is configured with the upper cutter 18A and the lower cutter 18B being in a spaced relation that allows the user to make accurate cuts in a single motion, thereby quickly and efficiently taking samples while ensuring that the correct portion of the stalk 12 is removed.

The device 10 is configured to retain the stalk 12 between the upper cutter 18A and the lower cutter 18B until the user removes the sample from the device 10 to ensure that the stalk 12 does not fall to the ground 14 and become contaminated. The upper cutter 18A and the lower cutter 18B of the stalk cutter device 10 are spaced the desired length A of eight (8) inches from each other, with the lower cutter 18B being spaced the desired distance B of six (6) inches above the footing 34. Under the method of use, the eight (8)-inch section A of the stalk 12 is sampled between six (6) and fourteen (14) inches above the ground 14 following physiological maturity in the field, and then all of the stalk 12 samples are compiled and submitted for analysis using the CSNT, which returns N recommendations for the following year's crop production.

In addition, the stalk cutter device 10 may include a strap 36 or other similar carrying mechanism to help the user carry the device 10 from location to location during use. Moreover, the stalk cutter device 10 may be motorized with the support post 28 being joined to a suitable transmission (not shown) for transmitting the rotation from a motor (not shown) to the cutters 18 in order to cut the sample stalk 12. Furthermore, the stalk cutter device 10 may be constructed from any suitable durable, resilient and lightweight material, such as aluminum or a composite material.

Whereas, the devices and methods have been described in relation to the drawings and claims, it should be understood that other and further modifications, apart from those shown or suggested herein, may be made within the scope of the invention.

What is claimed is:

1. A stalk cutter device for obtaining a desired length of a plant stalk from a desired distance from the ground, said device comprising:
    an upper lopper comprising a pair of ergonomic handles and a pruning cutter at a terminal end of said handles; said handles of said upper lopper further comprising generally horizontal upper members;
    a lower lopper comprising a pair of ergonomic handles and a pruning cutter at a terminal end of said handles; said handles of said lower lopper comprising generally horizontal lower members;
    said handles of said upper lopper and said handles of said lower lopper connected together via upright handle portions to reduce the extent to which a user must bend over in order to obtain said desired length of said stalk; said upright handle portions comprising generally upright members respectively connected to said generally horizontal upper members of said upper lopper; said generally upright members of said upright handle portions respectively connected to handgrip portions; said handgrip portions being angled in relation to said generally horizontal upper members and said generally upright members; said handgrip portions of said upright handle portions respectively connected to generally vertical connection members; said generally vertical connection members, said generally upright members, or both of said upright handle portions extending above said generally horizontal members of said upper lopper; said generally vertical connection members further respectively connected to said generally horizontal lower members of said lower lopper; and
    a support rod mounted through a pivot point of said cutter of said upper lopper and a pivot point of said cutter of said lower lopper, said support rod extending downwardly from said cutter of said lower lopper said desired distance, said cutter of said upper lopper and said cutter of said lower lopper being axially aligned and coaxially spaced along said support rod, said cutter of said upper lopper and said cutter of said lower lopper configured in a spaced relation for obtaining said desired length of said stalk in a single motion, and said cutter of said upper lopper and said cutter of said lower lopper configured for retaining said stalk and preventing contamination of said stalk when obtaining said desired length of said stalk from said desired distance from the ground.

2. The stalk cutter device of claim 1 wherein said cutters are spaced eight (8) inches from each other.

3. The stalk cutter device of claim 2 wherein one of said cutters is spaced six (6) inches above a terminal end of said support rod.

4. The stalk cutter device of claim 1 further comprising a left handle and a right handle each pivotally connected to an upper cutter and a lower cutter.

5. The stalk cutter device of claim 4 wherein said upper cutter and said lower cutter are axially aligned and coaxially spaced along said support rod.

6. The stalk cutter device of claim 5 wherein said upper cutter is spaced eight (8) inches from said lower cutter.

7. The stalk cutter device of claim 6 wherein said lower cutter is spaced six (6) inches from a terminal end of said support rod.

8. The stalk cutter device of claim 4 further comprising said upper cutter and said lower cutter in said spaced relation for obtaining an eight (8)-inch sample of a cornstalk from between six (6) and fourteen (14) inches above the ground.

9. The stalk cutter device of claim 1 wherein said support rod further comprises a footing to support said device on the ground during use.

10. The stalk cutter device of claim 1 further comprising a carrying strap.

11. The stalk cutter device of claim 1 wherein said device is constructed of a durable, resilient and lightweight material.

12. The stalk cutter device of claim 11 wherein said material is aluminum or a composite material.

* * * * *